July 31, 1934. W. PEYINGHAUS 1,968,703
CORE MOLDING APPARATUS
Filed July 23, 1932
Fig.1
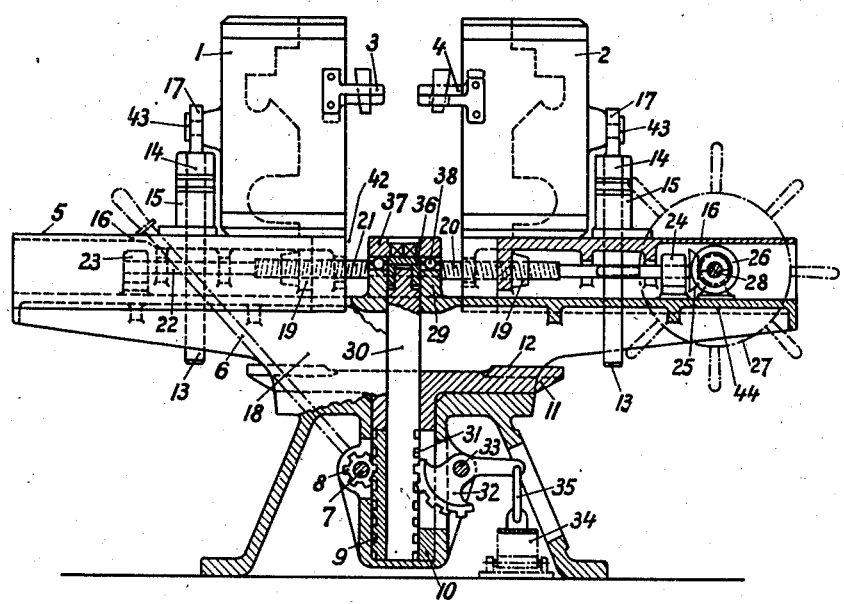
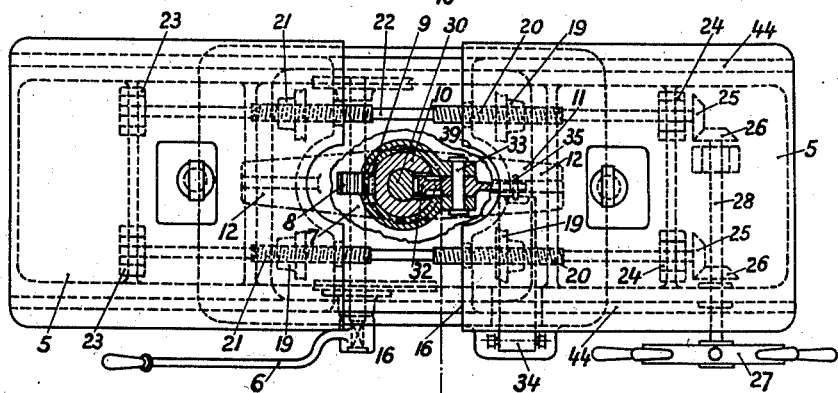
Fig.2
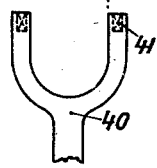
Fig.3
Inventor:

Patented July 31, 1934

1,968,703

UNITED STATES PATENT OFFICE 1,968,703

CORE MOLDING APPARATUS

Walter Peyinghaus, Egge, near Volmarstein, Ruhr, Germany

Application July 23, 1932, Serial No. 624,277
In Germany July 24, 1931

10 Claims. (Cl. 22—10)

Core molding machines, which are applicable, more especially, to the making of cores of very irregular shape or contour, have to satisfy a great variety of requirements. The first of these requirements consists in the disposition of the outermost extensions of the core in the vicinity of the core box openings through which the core material is introduced. There exists the further problem of conveying the core upside down to the place where it is to be used, more particularly, transporting it into the mold, since in this position the core is least exposed to the risk of injury. Furthermore, it should be possible for the core molder to open up the core box without risk of damaging the finished core; he should be able to examine the core all over when it is finished and to rectify small faults with facility and, finally, it should be ensured that the core can, without risk of injury, be removed from the molding table and conveyed to the transporting means.

The core molding machine contemplated in the present invention, as means for solving the aforementioned problems is characterized first and foremost by the core box being arranged for rotation. Since the bottom part of the core box preferably rests on a molding table, which affords the necessary bottom bearing surface or support in forming the core within the hollow chamber of the core box, the latter must, in order to permit of its being rotated, be arranged so that it can be raised and lowered relatively to the said molding table. Moreover, it is advantageous for the parts of the core box to be guided in a straight line parallel to the surface of the molding table. In furtherance of the conception embodied in this invention, the core itself is arranged to be rotatable, when finished, about a straight line perpendicular to the molding table; moreover it is preferably movable up and down relatively to said molding table.

These characteristic features in a core-molding machine according to the invention afford the following possibilities. In the first place, owing to the possibility of raising and rotating the core box and again bringing it to rest on the surface of the molding table (i. e. lowering it) the core molder disposes the core in a position such that the outermost extensions thereof lie in the vicinity of the openings through which the core material is introduced into the core box. In this way it is possible to pack these widely extending parts of the core very tightly, that is to say, to bring them generally into a condition which imparts an especial degree of strength to these outstanding or projecting parts. When the core is ready, the core molder can again rotate the core box so that the widely projecting parts of the core are now brought to the position in which they give the least trouble in transport. Owing to the parts of the core box being guided in a straight line parallel to the surface of the molding table, a further possibility is opened up, in that the said core box parts can be withdrawn from the finished core without a core box part being capable of displacement in a direction transverse to the surface of the molding table and thus damaging the finished core. The finished core is arranged so that it can be lifted from the surface of the molding table. Thus the molder can make the strictest possible examination of the core at eye level; such examination is facilitated by the fact that the core is also arranged to be rotatable about an axis lying perpendicular to the surface of the molding table, so that the core molder can, without any difficulty, make up or complete such parts of the core as have not been perfectly formed in the molding.

The expression "core molding machine" essentially implies that these movements, at least in part, are effected mechanically. This applies, more particularly, to the raising and lowering of the core box, to the guiding of the parts of the core box in a straight line parallel to the surface of the molding table and to the raising and lowering of the core itself. In order that the movements to be effected mechanically may be rendered independent of the core molder's strength, it is preferable that at least those movements which require force to be exerted be effected with the assistance of mechanical transmission gearing, pneumatic, hydraulic or electric driving mechanisms.

Finally, the lifting of the finished core from the surface of the molding table involves especial difficulties. This problem is solved in a particularly simple and advantageous manner by the core carrying surface of a section of the molding table—which section is arranged to be raised and lowered relatively to the rest of said table—being smaller than the bottom surface of the core. If, when the core has been completed in the core box, this section of the molding table be lifted relatively to the remaining parts of the molding table surface and if the examination of the core and the rectification and remaking thereof is finished, it is then only necessary to introduce a forked transport device in such a way that the section of the molding table which has been lifted above the molding table surface lies between the prongs of the fork, while the bottom face of the core, projecting beyond the supporting surface of said movable section of the molding table, lies over the said prongs. The core can then be lifted in a direction transverse to, and preferably perpendicular to, the surface of the molding table, without there being any movements in the direction of said table surface, such as always lead to the core being damaged.

In the drawing, which shows, by way of example, an embodiment of the idea underlying this invention;

Fig. 1 is in part a side elevation of and in part a longitudinal section through a core molding machine according to the invention.

Fig. 2 is a plan view of the core molding machine and a partial longitudinal horizontal section through the driving members.

Finally, Fig. 3 is a plan of the forked device which serves for raising and transporting the core.

In all the views 1 and 2 designate the two halves of the bipartite core box. When set for filling the two parts of the core box are preferably so locked together by means of appropriate devices 3, 4 that no unintended opening of the core box is possible. Now, according to the invention, the core box 1, 2 is arranged so that it can be raised and lowered relatively to the molding table surface 5, which during molding of the core, provides the requisite bottom support of the core box bore, in order that the core box can be rotated in such a way that when the core is being made, the greater or more important projecting parts lie upwards towards the filling openings for the core material; furthermore the core box can be placed in a position in which these projections lie at the bottom, next to the molding table surface 5. This positioning of the core is necessary in order that it may be transported without risk of injury. In the constructional example the raising and lowering of the core box is effected purely mechanically by the simple interposition of a transmission, or purchase gear, adapted to reduce the amount of manual effort required. For this purpose there is provided a hand lever 6 which rotates a pinion 8 through a shaft 7. The pinion 8 engages a sleeve 10, provided at 9 with teeth in the form of a rack, the upper end face of said sleeve resting against a traverse 11 guided in the direction of lifting. Pressure faces 12, arranged on the top side of the traverse, rest, when the core box is closed, against the bottom end faces 13 of the bearer columns 14, arranged for longitudinal displacement. Bushes 15, which are fixedly connected to slides 16 forming the molding table surface 5, serve to guide the bearer columns 14. The bearer columns carry at their upper ends bearing eyes 17, in which the pintles 43 of the core box parts 1 and 2 are rotatably accommodated. The slides 16, the upper boundary surface of which constitutes the surface of the molding table, have sliding movement upon guides 44 on the machine frame 18, which serves also to guide the sleeve 10. As shown in Fig. 2, the dividing plane between the halves 1 and 2 of the core box coincides with the dividing plane between the slides 16. In order to impart motion to the slides 16 the transverse ribs 19 thereof are furnished with female quick-threads in which correspondingly quick-threaded worms or male threaded members are received, the worms 20 having right or left handed threads according as the worms 21 have left or right handed threads. The worms 20 and 21 are mounted on spindles 22, which are fixedly mounted at 23 and 24 in the frame 18; they carry at their one end toothed bevel wheels 25 through which they engage with the counter bevel wheels 26 of an adjusting shaft 28 adapted to be actuated by a hand-wheel 27. According to the movement of the hand-wheel 27 the halves 1, 2 of the core box approach each other or recede from each other in a straight line parallel to the surface of the molding table. The frame 18 carries a sleeve 29, concentric with the vertical central axis of the molding machine and in this sleeve is longitudinally guided a mandrel 30. This mandrel, therefore, also lies concentric with the sleeve 10 and, like the latter, is provided at 31 with rack teeth in which a toothed segment 32 engages. The toothed segment 32 is mounted at 33 in the frame 18 and is movable by means of a pedal lever 34 through the actuating member 35. At its upper end the mandrel 30 carries a box or bush 36 which provides a rotary bearing as between said mandrel and the circular bearer surface 37 for the core; a ball bearing 38 between the bearer surface 37 and sleeve 29 takes up the axial thrust. The diameter of the bearer surface 37 is here so proportioned as to be less than the bottom surface of the core. To correspond to the shaping of the bearer surfaces 37 and sleeve 29, the slides 16 are hollowed out semicircularly in the dividing plane, at 39, so that when the core box is in the molding position they surround and enclose the molding table section 37 which is arranged to be raisable and lowerable, relatively to the molding table surface, through the agency of the pedal 34.

The apparatus thus characterized functions in the following manner. As already mentioned above, the core molder first of all arranged the core box members 1, 2, united by means of the device 3, 4 to form a closed core box, in the position in which the stoutest, projecting parts of the core lie in the vicinity of the opening for filling in the material to be molded. Thereupon the core material is introduced and the core molded. After molding the core, the core molder, by moving the hand lever 6, lifts the core box far enough for it to be rotatable through 180 degrees, so that now the heavier parts of the core lie at the bottom, that is to say, next the molding table surface 5. The locking device 3, 4 is then undone and, by moving the hand-wheel 27, the two parts of the core box are retracted from the already molded core in a straight line parallel to the molding table surface 5, there being no possibility whatever of the core box halves moving transversely in relation to said surface and thus damaging the core. By moving the pedal 34, the core molder next raises the core over the molding table surface 5 so that he can examine it at eye level and, by rotating it by means of the rotatable bearer surface 37, can touch it upon all sides. During this operation the lifting device 34, 35, 30, 37 is maintained in the raised position by a locking mechanism, not shown, so that it is not necessary to stand on the foot lever 34 all the time. When the core is thought to be quite in order the forked device shown in Fig. 3 is introduced into the intermediate space 42 between the slides 16 in such a way that the bearer surface 37 lies in the space between the fork prongs, the bottom surface of the core, extending beyond the bearer surface 37 and resting on the said fork prongs. The core can now, without hindrance be lifted up in a direction transverse and preferably perpendicular to the surface of the molding table. The fork 40 is provided at 41 with recesses into which, after placing in position for transport, a counter-fork can be pushed, so that heavy cores, weighing up to several hundred kilogrammes can be raised by several transport workers or by crane-like devices with no trouble and transported to the mold.

It lies within purview of the invention here characterized to provide pneumatic, hydraulic or electrical driving arrangements in place of mechanical ones. Thus, for instance, the slides 16 may carry cylinders in which move pistons provided with rack rods engaging with toothed segments connected to the core box halves, so that the core box is rotated pneumatically or hydraulically. Like devices may be used for raising the core box and the bearer surface and for shifting the halves of the core box in a straight line parallel to the surface of the molding table. Furthermore the control members 6 and 34 may be coupled together in any suitable manner, without these modifications and simplifications, many and various of which are possible, causing any departure from the spirit of the invention.

I claim:

1. In a core molding machine the combination with a bipartite core box and core box supporting means including means for moving the parts of said core box together and apart of means operable in the closed condition of said core box to lift said core box bodily from said core box supporting means, said core box being rotatively associated with said lifting means.

2. In a core molding machine the combination with a bipartite core box and core box supporting means including a supporting slide for each part of the core box, means for shifting said slides with their associated core cox parts together and apart and means for guiding said slides in predetermined paths during such movements of means operable in the closed condition of said core box to lift said core box bodily from said core box supporting means, said core box being rotatively associated with said lifting means.

3. In a core molding machine a molding table, a bipartite core box adapted normally to rest thereon, said molding table including means for separating and approximating the halves of the core box in a straight line path parallel to the surface of said molding table and means operable in the closed condition of the core box to lift the same from the surface of the molding table, the halves of said core box being rotatively connected each to a corresponding element of said lifting means.

4. In a core molding machine a molding table, a bipartite core box normally carried upon the surface of said molding table, means associated with said molding table for separating and closing together the two parts of the core box and means for raising and lowering the closed core box relatively to the surface of said molding table, said core box being so connected with said raising and lowering means as to be rotatable thereon when in raised position.

5. In a core molding machine a molding table, a bipartite core box normally carried upon the surface of said molding table, said molding table including means for simultaneously retracting the parts of the core box from a molded core and means for supporting said core independently of said core box parts, means for raising and lowering the closed core box relatively to the surface of said molding table and actuating means for said last named means, said core box being so connected with said raising and lowering means as to be rotatable thereon when in raised position.

6. In a core molding machine a molding table, a bipartite core box normally carried upon the surface of said molding table said molding table including means for simultaneously retracting the parts of the core box from a molded core and rotatable means for supporting said core independently of said core box parts, means for raising and lowering the closed core box relatively to the surface of said molding table and actuating means for said last named means, said core box being so connected with said raising and lowering means as to be rotatable thereon when in raised position.

7. A core molding machine according to claim 1, wherein means is provided for raising and lowering the core with respect to the surface of the molding table.

8. A core molding machine according to claim 2, in which the bearer surface of that part of the molding table which carries the core and which is adapted to be raised and lowered relatively to the remaining part of the molding table surface is smaller than the bottom face of the said core, so that transport devices which embrace the said portion of the molding table after the fashion of a fork can be employed.

9. A core molding machine according to claim 3, in which the parts of the molding table which closely embrace the part which is adapted to be raised and lowered are slidably mounted and carry the parts of the core box.

10. In a core molding machine the combination with a multipartite core box and core box supporting means including means for moving the parts of said core box together and apart of means operable in the closed condition of said core box to lift said core box bodily from said core box supporting means, said core box being rotatively associated with said lifting means.

WALTER PEYINGHAUS.